(12) United States Patent
Dey et al.

(10) Patent No.: US 11,735,166 B2
(45) Date of Patent: Aug. 22, 2023

(54) METHOD AND SYSTEM FOR AUTOMATIC SPEECH RECOGNITION IN RESOURCE CONSTRAINED DEVICES (71) Applicant: Tata Consultancy Services Limited, Mumbai (IN)

(72) Inventors: Swarnava Dey, Kolkata (IN); Jeet Dutta, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 298 days.

(21) Appl. No.: 17/361,408

(22) Filed: Jun. 29, 2021

(65) Prior Publication Data

US 2022/0157297 A1 May 19, 2022

(30) Foreign Application Priority Data

Nov. 13, 2020 (IN) .............................. 202021049837

(51) Int. Cl.
*G10L 15/06* (2013.01)
*G06N 3/088* (2023.01)
(Continued)

(52) U.S. Cl.
CPC ............ *G10L 15/063* (2013.01); *G06N 3/044* (2023.01); *G06N 3/045* (2023.01); *G06N 3/088* (2013.01);
(Continued)

(58) Field of Classification Search
CPC ....... G10L 15/063; G10L 15/04; G10L 15/05; G10L 15/06; G10L 15/16
See application file for complete search history.

(56) References Cited

U.S. PATENT DOCUMENTS

| 8,131,545 B1 * | 3/2012 | Moreno | ................... G10L 15/04 |
|---|---|---|---|
| | | | 704/235 |
| 9,697,835 B1 | 7/2017 | Kuo et al. | |

(Continued)

FOREIGN PATENT DOCUMENTS

CN 111354346 A 6/2020

OTHER PUBLICATIONS

Panayotov et al., "Librispeech: an asr corpus based on public domain audio books." 2015 IEEE international conference on acoustics, speech and signal processing (ICASSP). IEEE (Year: 2015).*
Hannun, et al., "Deep speech: Scaling up end-to-end speech recognition." arXiv preprintarXiv:1412.5567 (Year: 2014).*

(Continued)

*Primary Examiner* — Samuel G Neway
(74) *Attorney, Agent, or Firm* — Finnegan, Henderson, Farabow, Garrett & Dunner LLP (57) ABSTRACT

Automatic speech recognition techniques are implemented in resource constrained devices such as edge devices in internet of things where on-device speech recognition is required for low latency and privacy preservation. Existing neural network models for speech recognition have a large size and are not suitable for deployment in such devices. The present disclosure provides an architecture of a size constrained neural network and a method of training the size constrained neural network. The architecture of the size constrained neural network provides a way of increasing or decreasing number of feature blocks to achieve an accuracy-model size trade off. The method of training the size constrained neural network comprises creating a training dataset with short utterances and training the size constrained neural network with the training dataset to learn short term dependencies in the utterances. The trained size constrained neural network model is suitable for deployment in resource constrained devices.

11 Claims, 5 Drawing Sheets

(51) Int. Cl.
*G10L 15/04* (2013.01)
*G10L 15/16* (2006.01)
*G10L 15/22* (2006.01)
*G10L 15/28* (2013.01)
*G10L 25/78* (2013.01)
*G06N 3/044* (2023.01)
*G06N 3/045* (2023.01)
*G10L 15/05* (2013.01)

(52) U.S. Cl.
CPC .............. *G10L 15/04* (2013.01); *G10L 15/05* (2013.01); *G10L 15/16* (2013.01); *G10L 15/22* (2013.01); *G10L 15/28* (2013.01); *G10L 25/78* (2013.01); *G10L 15/06* (2013.01)

(56) References Cited

U.S. PATENT DOCUMENTS

| | | | | |
|---|---|---|---|---|
| 2003/0182121 | A1* | 9/2003 | Hwang | G10L 15/065 |
| | | | | 704/E15.009 |
| 2020/0160866 | A1* | 5/2020 | Szymanski | G06N 3/02 |
| 2021/0312905 | A1* | 10/2021 | Zhao | G10L 15/16 |
| 2022/0157297 | A1* | 5/2022 | Dey | G10L 15/04 |

OTHER PUBLICATIONS

Xavier Anguera et al., "Audio-to-text alignment for speech recognition with very limited resources," Computer Science, Sep. 2014, Interspeech, http://www.xavieranguera.com/papers/IS2014_phonealignment.pdf.
Andreas Kirkedal et al., "FT Speech: Danish Parliament Speech Corpus," Audio and Speech Processing, Oct. 2020, Arxiv, https://arxiv.org/pdf/2005.12368.pdf.

* cited by examiner

METHOD AND SYSTEM FOR AUTOMATIC SPEECH RECOGNITION IN RESOURCE CONSTRAINED DEVICES

PRIORITY CLAIM

This U.S. patent application claims priority under 35 U.S.C. § 119 to India Application No. 202021049837, filed on Nov. 13, 2020. The entire contents of the aforementioned application are incorporated herein by reference.

TECHNICAL FIELD

The disclosure herein generally relates to the field of automatic speech recognition, and, more particularly, to a method and system for automatic speech recognition in resource constrained devices.

BACKGROUND

Automatic speech recognition (ASR) capability is becoming important on resource constrained embedded devices (hereafter referred to as 'devices') used in applications such as but not limited to voice controlled unmanned aerial vehicles (UAV), conversational agents for telepresence robots and edge devices in Internet of Things applications and so on. Such devices are often deployed in scenarios where internet connectivity is intermittent and on-device inference is needed for low latency and privacy preservation. Very small size ASR models, typically of size in the range 15-20 MB, are required for such devices since they have limited memory and processing capacity.

Existing ASR implementations train a deep neural network which result in large size models. It is challenging to run such models in the devices as the model sizes are not small enough to fit in the cache memory of the devices, resulting in a performance hit. Some of the state of art technologies have attempted techniques such as model compression, parallel processing etc. to reduce the model size but these methods involve additional processing steps after training the model and do not result in very small size models suitable for deployment in edge devices.

Further, the small sized models need to recognize speech online as and when an utterance is received as input. For this purpose, the model has to be trained to recognize short bursts of words which requires a training dataset with short utterances. Only a few documented techniques for getting smaller samples with corresponding labels are available, for example, Mozilla DeepSpeech and Kaldi ASR data preparation. While processing speech signal, these methods generate labels for a feature frame corresponding to a current timestep on the fly during training, requires some manual intervention and results in some data loss.

SUMMARY

Embodiments of the present disclosure present technological improvements as solutions to one or more of the above-mentioned technical problems recognized by the inventors in conventional systems.

For example, in one embodiment, a method for automatic speech recognition in resource constrained devices is provided. An audio file is received as input, via one or more hardware processors. Further, each of a plurality of utterances in the audio file are transcribed using an acoustic model to generate an Intermediate Greedy Transcript (IGT), via the one or more hardware processors. Further one or more split locations are marked in the IGT by: splitting the IGT based on a space symbol to generate a plurality of pieces of IGT; determining acoustically distinct and indistinct words in each of the plurality of pieces of IGT; and labeling space after the acoustically distinct words with a marker, via the one or more hardware processors. Further, the audio file is spliced at locations where corresponding IGT has the marker to get a set of audio segments, via the one or more hardware processors. Further, each audio segment from the set of audio segments is associated with corresponding transcript from the IGT, via the one or more hardware processors. The set of audio segments with corresponding transcript form a training dataset. Further, a size-constrained neural network model is trained with the training dataset to get a trained model for recognizing short bursts of words, via the one or more hardware processors.

In another aspect, a system for automatic speech recognition in resource constrained devices is provided. The system comprises a memory storing instructions; one or more Input/Output (I/O) interfaces; and one or more hardware processors coupled to the memory via the one or more I/O interfaces, wherein the one or more hardware processors are configured by the instructions to receive an audio file as input. Further, each of a plurality of utterances in the audio file are transcribed using an acoustic model to generate an Intermediate Greedy Transcript (IGT), via the one or more hardware processors. Further one or more split locations are marked in the IGT by: splitting the IGT based on a space symbol; determining acoustically distinct and indistinct words in each piece of IGT; and labeling space after the acoustically distinct words with a marker, via the one or more hardware processors. Further, the audio file is spliced at locations where corresponding IGT has the marker to get a set of audio segments, via the one or more hardware processors. Further, each audio segment from the set of audio segments are associated with corresponding transcript from the IGT, via the one or more hardware processors. The set of audio segments with corresponding transcript form a training dataset. Further, a size-constrained neural network model is trained with the training dataset to get a trained model for recognizing short bursts of words, via the one or more hardware processors.

In yet another aspect, there are provided one or more non-transitory machine readable information storage mediums comprising one or more instructions, which when executed by one or more hardware processors causes a method for automatic speech recognition in resource constrained devices. The method comprises receiving an audio file as input, via one or more hardware processors. Further, each of a plurality of utterances in the audio file are transcribed using an acoustic model to generate an Intermediate Greedy Transcript (IGT), via the one or more hardware processors. Further one or more split locations are marked in the IGT by: splitting the IGT based on a space symbol, determining acoustically distinct and indistinct words in each piece of IGT, and labeling space after the acoustically distinct words with a marker, via the one or more hardware processors. Further, the audio file is spliced at locations where corresponding IGT has the marker to get a set of audio segments, via the one or more hardware processors. Further, each audio segment from the set of audio segments are associated with corresponding transcript from the IGT, via the one or more hardware processors. The set of audio segments with corresponding transcript form a training dataset. Further, a size-constrained neural network model is trained with the training dataset to get a trained model for recognizing short bursts of words, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for automated speech recognition in resource constrained devices. Unlike existing methods that require additional processing steps after training a neural network model for speech recognition for developing small sized models suitable for resource constrained devices, the method and system disclosed herein provides a way of training a size constrained neural network on short utterances which result in a small size model suitable for resource constrained devices.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
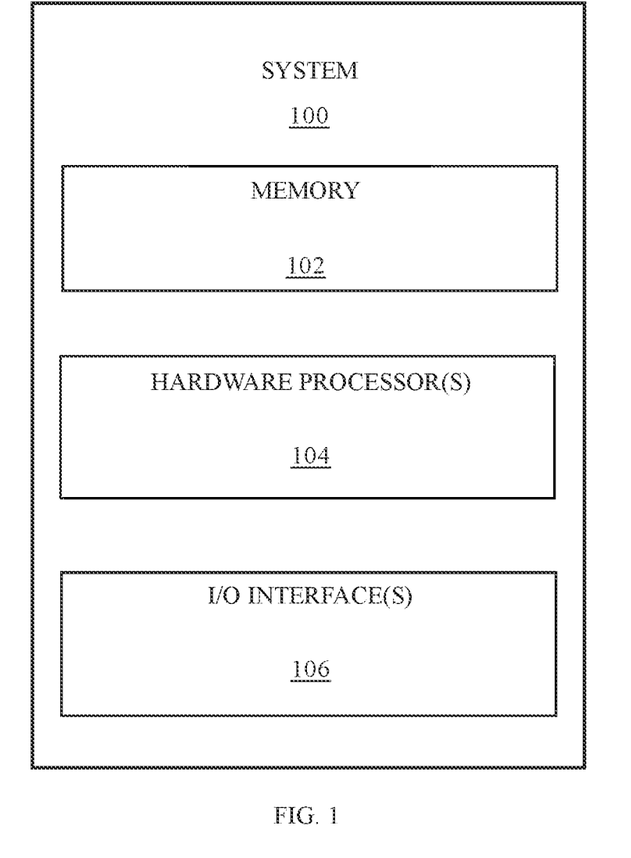
FIG. 1 is a functional block diagram of a system for automatic speech recognition in resource constrained devices, in accordance with some embodiments of the present disclosure.

FIG. 1 is a functional block diagram of a system for automatic speech recognition in resource constrained devices, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure.

Figure 2:
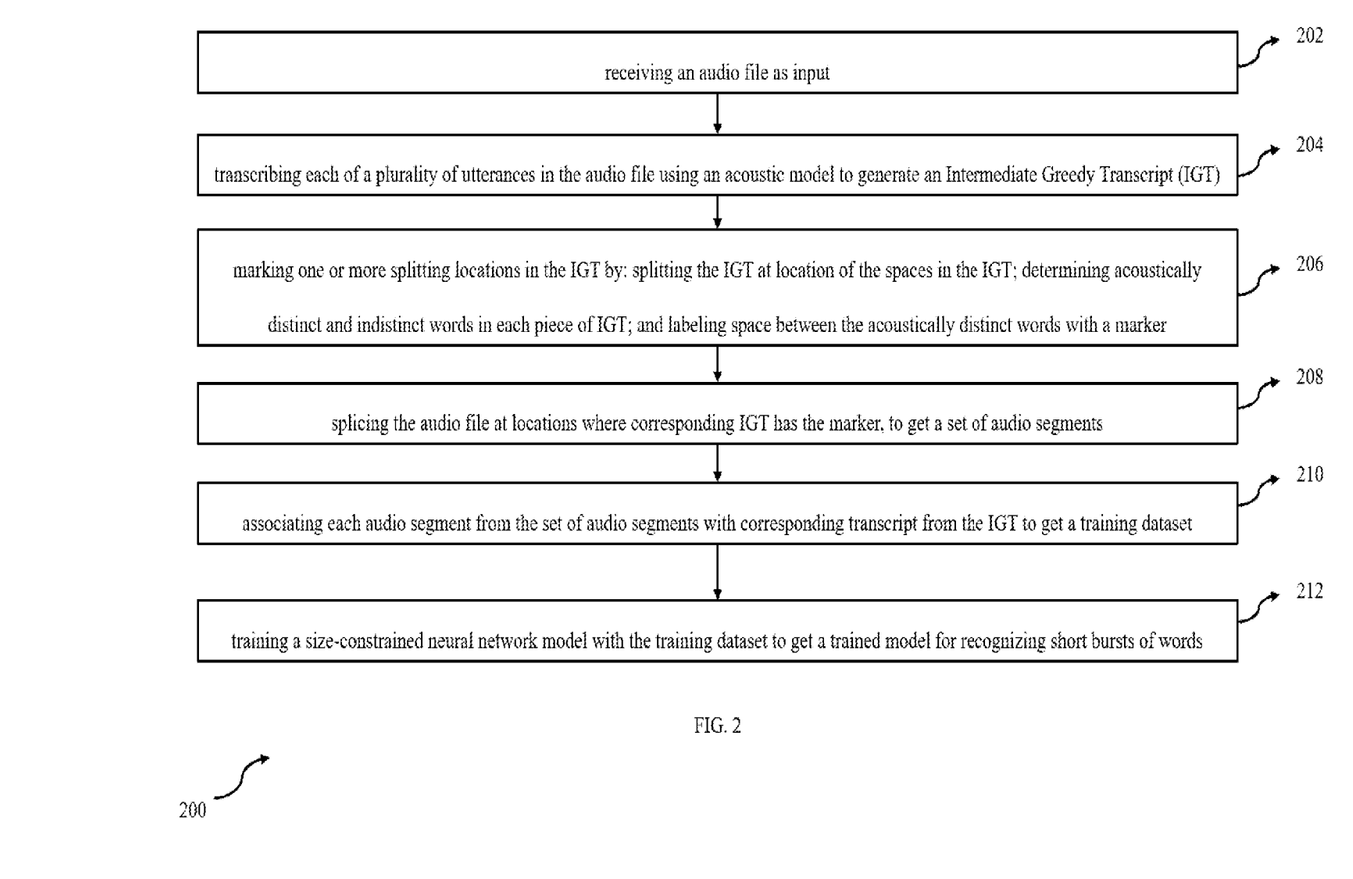
FIG. 2 is a flow diagram illustrating a method for automatic speech recognition in resource constrained devices, implemented by the system of FIG. 1, in accordance with some embodiments of the present disclosure.

Functions of the components of system 100 are now explained in conjunction with flow diagram of FIG. 2 for automatic speech recognition in resource constrained devices.

FIG. 2 is a flow diagram illustrating a method for automatic speech recognition in resource constrained devices, implemented by the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of method 200 by the processor(s) or one or more hardware processors 104. The steps of the method 200 of the present disclosure will now be explained with reference to the components or blocks of the system 100 as depicted in FIG. 1, the steps of flow diagram as depicted in FIG. 2 and the size constrained neural network illustrated in FIGS. 3A and 3B (collectively referred as FIG. 3). Although process steps, method steps, techniques or the like may be described in a sequential order, such processes, methods and techniques may be configured to work in alternate orders. In other words, any sequence or order of steps that may be described does not necessarily indicate a requirement that the steps are to be performed in that order. The steps of processes described herein may be performed in any order practical. Further, some steps may be performed simultaneously.

The method 200 disclosed herein provides a method of training a size constrained neural network for automatic speech recognition in resource constrained devices.

Referring to the steps of the method 200, at step 202, one or more hardware processors 104 are configured to receive an audio file as input. The audio file may contain a plurality of utterances from one or more subjects. In an embodiment, when deployed in an environment, the system 100 may automatically detect and capture the utterances generated within range of the system 100, wherein the range may vary based on properties of an input interface (for example, a microphone) being used by the system 100 to capture the utterances. In another embodiment, a pre-recorded audio file may be fed to the system 100 as input, using one or more suitable interfaces provided by the I/O interface 106. In an embodiment, the audio file is in Waveform (WAV) audio file format. Any audio file formats from which acoustic features such as Mel Frequency Cepstral Coefficient (MFCC) can be extracted may be used in alternate embodiments.

The plurality of utterances in the audio file are of variable lengths and include acoustically distinct and indistinct words. However, in order to achieve the objective of present disclosure i.e. automatic speech recognition in resource constrained devices, a training dataset comprising short utterances with aligned transcripts is required. Thus, the plurality of utterances have to be further divided into a plurality of short utterances comprising acoustically distinct words and length of the plurality of short utterances should be within a pre-defined range. It is achieved using steps 204-210 of the method 200 and explained in detail below. In an embodiment, short utterances with 2-3 acoustically distinct words is used. Other appropriate values may be selected as per requirements.

At step 204 of the method 200, the one or more hardware processors 104 are configured to transcribe each of the plurality of utterances in the audio file using an acoustic model to generate an Intermediate Greedy Transcript (IGT). In current context, the term "transcribe" refers to the process of translating an utterance to text (referred as "transcript" henceforth).

In an embodiment, the acoustic model is an encoder-decoder architecture built using one or more Recurrent Neural Network (RNN) variants comprising one or more Gated Recurrent Units (GRUs), a Long-Short Term Memory (LSTM), one or more Convolutional Neural Networks (CNN), and Fully Connected Neural Network (FCNN). It should be appreciated that use of any other such acoustic models is well within the scope of this disclosure.

The acoustic model is trained using a Connectionist Temporal Classification (CTC) algorithm for speech to text (hereafter referred as "transcript") conversion. CTC is a technique available in literature for speech to text conversion. Other techniques such as hidden Markov model can also be used instead of CTC. The acoustic model takes the plurality of utterances as input and computes a probability distribution of transcripts for each of the plurality of utterances. A transcript with highest probability is chosen by using a best path decoding technique. The transcript is referred as Intermediate Greedy Transcript (IGT) since it is generated using the best path decoding technique in a greedy manner. It should be appreciated that any similar techniques of generating a transcript maybe used in alternate embodiments. Further, the acoustic model outputs IGT comprising transcription of the plurality of utterances, CTC blanks and spaces. The CTC blanks indicate repeated occurrence of a letter in the utterance and spaces indicate separation between words in the utterance. Second row of table 1 shows an example output of the acoustic model.

At step 206 of the method 200, the one or more hardware processors 104 are configured to mark one or more splitting locations in the IGT. The one or more splitting locations are marked based on presence of acoustically distinct and indistinct words. This is done to ensure that the words that are not acoustically distinct are not split since the boundary of these words are not clear. For example, consider a piece of IGT comprising the words KINGS ELECTED. These words are not acoustically distinct since the corresponding utterance may be KING SELECTED or KINGS ELECTED. In order to avoid such ambiguity, the acoustically indistinct words are preferably not split. The way in which such words are identified, and splitting locations are marked is explained below.

In the step 206, first the IGT is split into a plurality of pieces at location of the spaces in the IGT to generate a plurality of pieces of IGT.

Further, the system 100 identifies acoustically distinct and indistinct words in each of the plurality of pieces of IGT. The system 100 may use any suitable technique for identifying the acoustically distinct and indistinct words. For example, the system 100 may use a Word Boundary Detection (WBD) technique. The system 100 performs WBD by utilizing a number of contiguous CTC blanks and spaces to get a relative weight for word boundaries, as opposed to performing WBD by extracting lexical and acoustic information from the audio in state of the art systems. The WBD technique performed in present disclosure achieves same result as state of the art systems since acoustic and lexical information is already encoded in CTC blanks.

In an embodiment, the system 100 performs WBD by segregating each of the plurality of pieces of IGT into one of distinct, medium and indistinct bins based on following rules—(i) if the piece of IGT includes more than one CTC blanks and more than one spaces then it belongs to distinct bin, (ii) if the piece of IGT includes exactly one CTC blank and one space then it belongs to medium bin, or (iii) if the piece of IGT includes one or more CTC blanks and no spaces then it belongs to indistinct bin. Further, each word in each of the plurality of pieces of IGT belonging to distinct, medium and indistinct bin are assigned a weight 0.9, 0.6 and 0.3 respectively. Further, a plurality of target words are identified in each of the plurality of pieces of IGT wherein each of the plurality of target words ends with a vowel, semi-vowel, or fricative (set $\{a, e, o, u, s, w, y, z\}$) or the consecutive word begins with any of these letters. The set $\{a, e, i, o, u, s, w, y, z\}$ is determined experimentally and can be extended or any other set of letters for identifying target words may be used in an alternate embodiments. Target words are in fact the words which have indistinct word boundary. Hence, this step is skipped for words belonging to distinct bin. Further, a value 1 is assigned to each of the plurality of target words and a value 0 is assigned to each word other than the plurality of target words. Further, a linear interpolation of the weight of the bin corresponding to each of the plurality of words and the value assigned to each of the plurality of words to calculate a merge score which determines if each of the plurality of words is acoustically indistinct or not. In an example implementation of present disclosure, merge score of each word is calculated using equation 1:

$$\text{merge\_score} = \alpha \times \text{target\_word\_value} - \beta \times \text{bin\_weight} \qquad (1)$$

In equation (1), values of $\alpha$ and $\beta$ are determined experimentally. If the merge score for a word is greater than a pre-defined threshold value, then the word is acoustically indistinct. Otherwise, the word is acoustically distinct. In an example implementation, value of $\alpha$ is 0.25, value of $\beta$ is 0.5 and the threshold value is considered as 0.1.

In an alternate embodiment, the system 100 performs WBD by segregating each of the plurality of pieces of IGT into one of distinct_ctc and indistinct_ctc bins based on following rules—(i) if the piece of IGT includes more than one CTC blanks then it belongs to distinct_ctc bin, or (ii) if the piece of IGT includes one CTC blank then it belongs to indistinct_ctc bin. Further, a plurality of target words are identified in each of the plurality of pieces of IGT wherein each of the plurality of target words ends with a vowel, semi-vowel, or fricative (set {a, e, i, o, u, s, w, y, z}) or the consecutive word begins with any of these letters. The set {a, e, i, o, u, s, w, y, z} is determined experimentally and can be extended or any other set of letters for identifying target words may be used in an alternate embodiments. Each of the plurality of target words are mapped to indistinct_tgt bin and each word other than target words in each of the plurality of pieces of IGT are mapped to distinct_tgt bin. Plurality of words in indistinct_ctc bin which are also present in indistinct_tgt bin are considered as acoustically indistinct.

Once the acoustically distinct and indistinct words are identified, the space after each acoustically distinct word is marked with a marker. In an embodiment, # symbol is used as a marker. Any other markers may be used in alternate embodiments. Table 1 provides an example transformation of transcript from long to short utterances separated by # marker.

TABLE 1

| SI. No. | Processing stage | Example transcript transformation |
|---|---|---|
| 1 | Original transcript | ARE YOUR KINGS ELECTED THEN ___ARE YOUR KINNGGS EE_LECTTT_ED TTHEN__ |
| 2 | Time aligned transcript | |
| 3 | Transcript with # marker | ___ARE YOUR##KINNGGS EE_LECTT_ED#TTHEN__ |

At step 208 of the method 200, one or more hardware processors 104 are configured to splice the audio file at locations where corresponding IGT has the marker, to get a set of audio segments. The audio file is spliced automatically using open source functions such as AudioSegment function from pydub module. Other open source functions maybe used in alternate embodiments.

In order to generate a training dataset of short utterances, the set of audio segments must be associated/aligned/labelled with corresponding transcripts from the IGT. Thus, at step 210 of the method 200, one or more hardware processors 104 are configured to associate each audio segment from the set of audio segments with corresponding transcript from the IGT to get a training dataset. The resultant training dataset comprises of short utterances with aligned transcripts, masking the long term dependencies in the utterances. Thus, the training dataset is suitable for training a neural network to learn short term dependencies to recognize short bursts of words.

At step 212 of the method 200, one or more hardware processors 104 are configured to train a size-constrained neural network model with the training dataset to get a trained model for recognizing short bursts of words. Any supervised training methods such as backpropagation algorithm may be used for training the size constrained neural network using the training dataset. The size-constrained neural network is illustrated in FIGS. 3A and 3B (collectively referred as FIG. 3), according to some embodiments of present disclosure.

The resultant model after performing step 212 has a small size (typically 15-20 MB) suitable for deployment in resource constrained devices. The small size of the model is due to two reasons. The first reason is that the neural network is trained with short utterances to learn only short term dependencies in the utterances unlike existing implementations in which neural networks are trained using utterances of variable lengths to learn both short term and long term dependencies. Thus, the learned weights and other parameters of the size constrained neural network are lesser than existing implementations, resulting in a smaller size compared to existing implementations. It is experimentally determined that the resulting size is suitable for deployment in resource constrained devices.

The second reason for small size of the model lies in the architecture of the size constrained neural network which enables addition or deletion of feature blocks to achieve accuracy-model size trade off. The architecture of the size constrained neural network is explained in detail below.

Figure 3A:
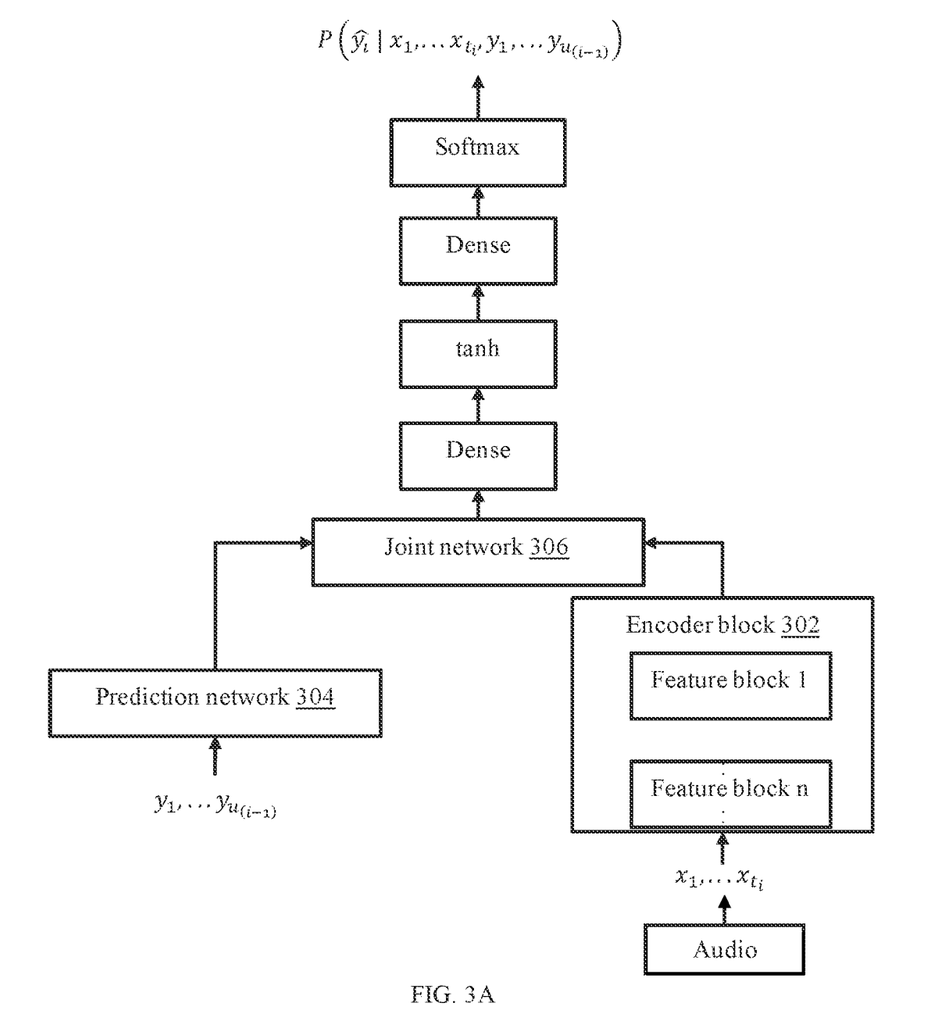
FIGS. 3A and 3B (collectively referred as FIG. 3) illustrate a size-constrained neural network trained using the method illustrated in FIG. 2 for automatic speech recognition, in accordance with some embodiments of the present disclosure.
Figure 3B:
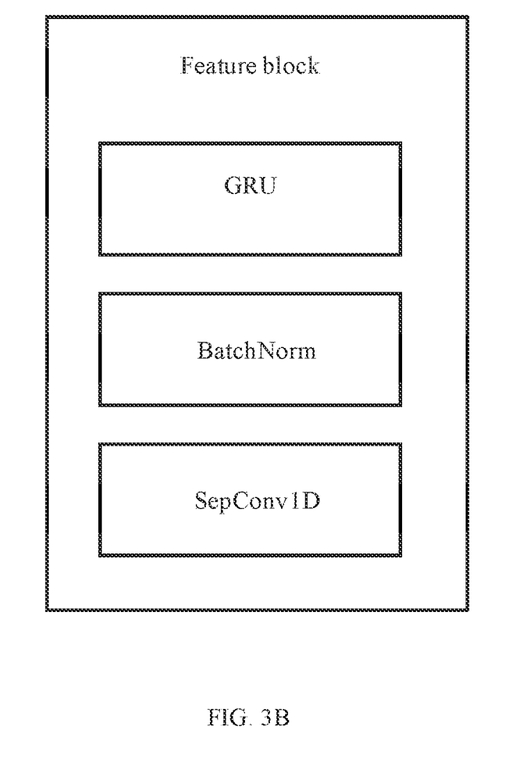

FIGS. 3A and 3B (collectively referred as FIG. 3) illustrate a size-constrained neural network trained using the method illustrated in FIG. 2 for automatic speech recognition, in accordance with some embodiments of the present disclosure. FIG. 3A illustrates the overall architecture of the size constrained neural network.

The size constrained neural network is a Recurrent Neural Network-Transducer (RNN-T) with encoder-decoder architecture. The RNN-T network is trained using the training dataset generated at step 210 of the method 200. At each time step, it generates a probability distribution (according to equation 2 given below) over the alphabets of language of the utterances (for example English) from the features of the audio in current timestep and label generated for the earlier timestep. In an example implementation, $x_1, \ldots x_{t_i}$ is a set of features of audio and $y_1, \ldots y_{u_i}$ is a set of labels corresponding to the audio. In an embodiment, the features of audio considered is Mel-frequency cepstral coefficients (MFCCs) calculated using existing methods in literature. Other audio features may be considered in alternate embodiments. The set of labels are the corresponding transcripts of the audio in the training dataset.

The probability distribution generated by the RNN-T architecture is given by equation (2).

$$P_{i,Y} = f_{RNN-T}(x_1, \ldots x_{t_i}, y_1, \ldots y_{u_{(i-1)}}) \quad (2)$$

The RNN-T architecture comprises an encoder block 302, a prediction network 304 and a joint network 306. The encoder block 302 is represented as $f_{Enc}(x_1, \ldots x_{t_i})$, and encodes the features of the audio. The encoder block includes one or more feature blocks. Further, the prediction network 304, represented as $f_{Pred}(y_1, \ldots y_{u_{(i-1)}})$, predicts a candidate label $\hat{y}$ corresponding to the encoded features of the audio. The probability distribution in equation (2) is achieved using operations as shown in equation (3).

$$f_{RNN-T}(z) = f_{Softmax} \circ f_{dense} \circ \tan h \circ f_{dense}(z) \quad (3)$$

In equation (3), $z = f_{Enc}(x_1, \ldots x_{t_i}) + f_{Pred}(y_1, \ldots y_{u_{(i-1)}})$ wherein value of z is calculated by the joint network 306.

FIG. 3B illustrates internal architecture of each of the one or more feature blocks within the encoder block 302, in accordance with some embodiments of present disclosure. Each of the one or more feature blocks comprises a 1 dimensional (1D) depth separable convolution (SepConv1D), batch normalization (BatchNorm), and Gated Recurrent Unit (GRU) stacked in order. Each of the one or more feature blocks are implemented according to equation (4).

$$f_{FeatBlock}(s) = f_{GRU} \circ f_{batchnorm} \circ f_{dsconv}(s) \quad (4)$$

Complexity of the encoder block 302 is increased gradually by manually adding feature blocks during training to gradually increase complexity of the RNN-T network as required. It is experimentally observed that each feature block costs around 400 thousand additional parameters and accounts for betterment of the character error rate (CER), providing control over model size vs accuracy trade-off. Optimal number of feature blocks can be determined experimentally. The encoder block 302 is implemented according to equation (5):

$$f_{ENC}(x_1, \ldots, x_{t_i}) = f_{FeatBlock} \circ f_{FeatBlock} \cdots \circ f_{FeatBlock}(x_1, \ldots, x_{t_i}) \quad (5)$$

In an embodiment, The RNN-T architecture is trained using TensorFlow implementation on RNN-T loss function.

Figure 4:
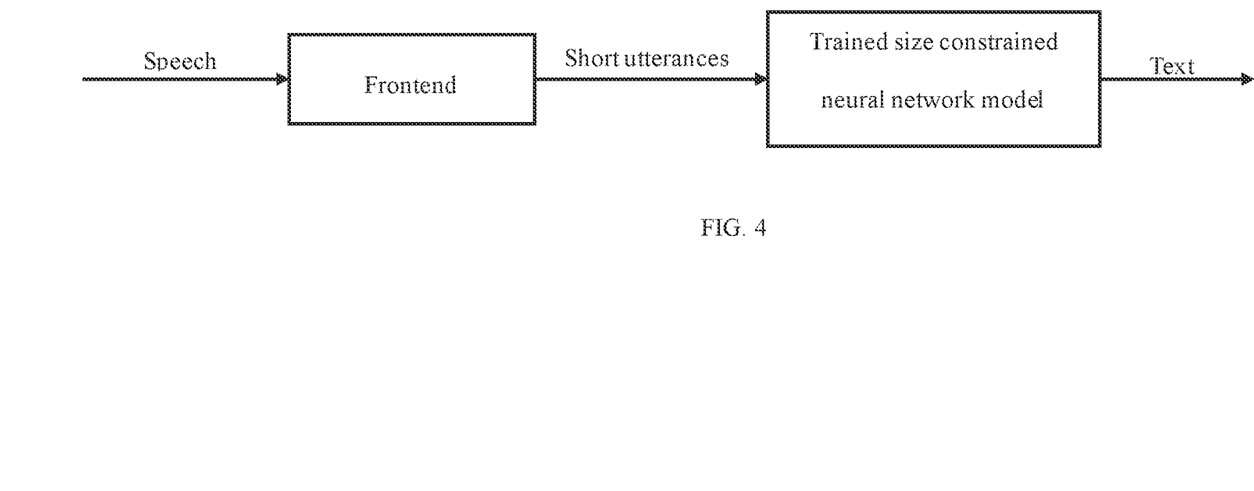
FIG. 4 illustrates an example implementation of a trained model for speech recognition in a resource constrained device, in accordance with some embodiments of the present disclosure.

FIG. 4 illustrates an example implementation of a trained model for speech recognition in a resource constrained device, in accordance with some embodiments of the present disclosure. The method of speech recognition in a resource constrained device using a trained model, trained using the method 200 of present disclosure, comprises: receiving speech of a subject comprising a plurality of utterances as input from a microphone of the resource constrained device. The input is received by frontend of the resource constrained device deployed in the same environment as that of the subject. Further, the frontend samples the input to get a plurality of frames. In an example implementation of the present disclosure, the frontend samples the input into audio chunks of size 2048 (128 ms at a rate of 16 KHz). Further, each of the plurality of frames are iteratively processed by detecting regions of voice and regions of silence in the frame using a voice activity detector; and passing the regions of voice as input to the trained model for speech recognition (referred as trained size constrained neural network model in FIG. 4). In an embodiment, WebRTC Voice Activity Detector (VAD) is used to detect regions of voice in each of the plurality of frames. Any other VADs may be used in alternate embodiments. The trained model recognizes words in the regions of voice and outputs the words as text.

Experimental Results:

Experimental results on accuracy vs. model size trade-off with proposed flexible feature block RNN-T architecture is given in Table 2.

Table 2 captures evaluation of the trained RNN-T model (illustrated in FIG. 3) on 2 types of datasets, namely utterances with longer temporal dependencies as in existing approaches for ASR and short bursts of 2-3 complete words disclosed in present disclosure. Five different models with a varying number of feature blocks are trained and their Character Error Rates (CER) are measured based on the Levenshtein's distance algorithm. Actual size of the model, number of parameters, and their CERs on the test set of both types of data are recorded in table 2. From the recorded data it can be observed that the models trained using a frame-based technique with limited past and future context perform well on the test set with long utterances but performs poorly (especially on the word bursts) when model sizes become very small. In contrast, the performance drop on size reduction is less evident for smaller model sizes trained on the short word burst dataset of the present disclosure. These results demonstrate the efficacy of training methodology of present disclosure when there is a hard constraint on the model size.

Table 3 illustrates comparison of implementation of the RNN-T model with 2 feature blocks on NVIDIA® Jetson Nano™ developer kit and NVIDIA® Jetson Nano™ implementation of DeepSpeech model. The size of the models, word error rates (WER) when the models are trained on long and short bursts of words and latency of the models are compared and results are recorded in Table 3. It is evident from data in table 3 that the proposed model architecture, albeit being limited in terms of parameter space, shows comparable accuracy for short word bursts, which is the aim of the present disclosure.

TABLE 3

| Model name | Size (in MB) | WER (short) | WER (long) | Latency |
|---|---|---|---|---|
| DeepSpeech | 93 | 12.62% | 14.51% | 4.5 seconds |
| RNN-T model with 2 feature blocks | 9 | 16.4% | 46.1% | 850 ms |

TABLE 2

Performance

| | Training mode | | Frame based | | Word burst | |
|---|---|---|---|---|---|---|
| RNN-T Architecture | Parameters | Size (in MB) | CER on long utterances | CER on short bursts | CER on long utterances | CER on short bursts |
| RNN-T with Feature Block 5 × (300 GRU, 1 D DS conv) | 3.81 | 15.3 | 30.73 | 26.34 | 49.95 | 31.80 |
| RNN-T with Feature Block 4 × (300 GRU, 1 D DS conv) | 3.41 | 13.7 | 41.21 | 36.65 | 51.57 | 38.68 |
| RNN-T with Feature Block 3 × (300 GRU, 1 D DS conv) | 3.02 | 11 | 43.16 | 56.84 | 51.92 | 44.34 |
| RNN-T with Feature Block 2 × (300 GRU, 1 D DS conv) | 2.63 | 8 | 50.41 | 60.15 | 54.93 | 46.11 |
| RNN-T with Feature Block 1 × (300 GRU, 1 D DS conv) | 2.23 | 6.5 | 58.78 | 65.17 | 58.87 | 60.36 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automatic speech recognition in resource constrained devices, the method comprising:
    receiving, by one or more hardware processors, an audio file as input;
    transcribing, by the one or more hardware processors, each of a plurality of utterances in the audio file using an acoustic model to generate an Intermediate Greedy Transcript (IGT);
    marking, by the one or more hardware processors, one or more splitting locations in the IGT, comprising:
        splitting the IGT based on a space symbol to generate a plurality of pieces of IGT;
        determining acoustically distinct and indistinct words in each of the plurality of pieces of IGT; and
        labeling space after the acoustically distinct words with a marker;
    splicing, by the one or more hardware processors, the audio file at locations where corresponding IGT has the marker, to get a set of audio segments;
    associating, by the one or more hardware processors, each audio segment from the set of audio segments with corresponding transcript from the IGT to get a training dataset; and
    training, by the one or more hardware processors, a size-constrained neural network model with the training dataset to get a trained model for recognizing short bursts of words.

2. The method as claimed in claim 1, wherein the trained model is used for speech recognition in a resource constrained device, the speech recognition comprising:
    receiving a user speech signal as input from a microphone of the resource constrained device;
    sampling the input to get a plurality of frames; and
    iteratively processing each of the plurality of frames by:
        detecting regions of voice in the frame using a voice activity detector; and
        passing the regions of voice as input to the trained model for speech recognition.

3. The method as claimed in claim 1, wherein the acoustic model is an encoder-decoder architecture built using one or more Recurrent Neural Network (RNN) variants comprising one or more Gated Recurrent Units (GRUs), a Long-Short Term Memory (LSTM), one or more Convolutional Neural Networks (CNN), and Fully Connected Neural Network (FCNN), wherein the one or more RNN variants are trained using a Connectionist Temporal Classification (CTC) algorithm.

4. The method as claimed in claim 1, wherein the size constrained neural network is a Recurrent Neural Network-Transducer (RNN-T) with encoder-decoder architecture wherein the encoder comprises one or more feature blocks.

5. The method as claimed in claim 4, wherein each of the one or more feature blocks comprises a 1 dimensional (1D) depth separable convolution, batch normalization, and Gated Recurrent Unit (GRU) stacked in order.

6. A system for automatic speech recognition in resource constrained devices, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
      receive an audio file as input;
      transcribe each of a plurality of utterances in the audio file using an acoustic model to generate an Intermediate Greedy Transcript (IGT);
      mark one or more splitting locations in the IGT comprising:
         splitting the IGT at locations of the spaces in the IGT to generate a plurality of pieces of IGT;
         determining acoustically distinct and indistinct words in each of the plurality of pieces of IGT; and
         labeling space after the acoustically distinct words with a marker;
      splice the audio file at locations where corresponding IGT has the marker, to get a set of audio segments;
      associate each audio segment from the set of audio segments with corresponding transcript from the IGT to get a training dataset; and
      train a size-constrained neural network model with the training dataset to get a trained model for recognizing short bursts of words.

7. The system as claimed in claim 6, wherein the trained model is used for speech recognition in a resource constrained device, the speech recognition comprising:
   receiving a user speech signal as input from a microphone of the resource constrained device;
   sampling the input to get a plurality of frames; and
   iteratively processing each of the plurality of frames by:
      detecting regions of voice in the frame using a voice activity detector; and
      passing the voice regions as input to the trained model for speech recognition.

8. The system as claimed in claim 6, wherein the acoustic model is an encoder-decoder architecture built using one or more Recurrent Neural Network (RNN) variants comprising one or more Gated Recurrent Units (GRUs), a Long-Short Term Memory (LSTM), one or more Convolutional Neural Networks (CNN), and Fully Connected Neural Network (FCNN), wherein the one or more RNN variants are trained using Connectionist Temporal Classification (CTC) algorithm.

9. The system as claimed in claim 6, wherein the size constrained neural network is a Recurrent Neural Network-Transducer (RNN-T) with encoder-decoder architecture wherein the encoder comprises one or more feature blocks.

10. The system as claimed in claim 9, wherein each of the one or more feature blocks comprises a 1 dimensional (1D) depth separable convolution, batch normalization, and Gated Recurrent Unit (GRU) stacked in order.

11. One or more non-transitory machine readable information storage mediums comprising one or more instructions which when executed by one or more hardware processors cause:
   receiving an audio file as input;
   transcribing each of a plurality of utterances in the audio file using an acoustic model to generate an Intermediate Greedy Transcript (IGT);
   marking one or more splitting locations in the IGT, comprising:
      splitting the IGT based on a space symbol to generate a plurality of pieces of IGT;
      determining acoustically distinct and indistinct words in each of the plurality of pieces of IGT; and
      labeling space after the acoustically distinct words with a marker;
   splicing the audio file at locations where corresponding IGT has the marker, to get a set of audio segments;
   associating each audio segment from the set of audio segments with corresponding transcript from the IGT to get a training dataset; and training a size-constrained neural network model with the training dataset to get a trained model for recognizing short bursts of words.

* * * * *